(12) United States Patent
Cornic et al.

(10) Patent No.: US 7,161,526 B2
(45) Date of Patent: Jan. 9, 2007

(54) BROADBAND RADAR AND MODULATOR, IN PARTICULAR FOR MICROWAVE SWITCHING OVER A VERY SHORT PERIOD

(75) Inventors: Pascal Cornic, St Renan (FR); Philippe Laviec, Plougastel Daoulas (FR); Bernard Liabeuf, Montrouge (FR); Francisco Melero, Clamart (FR)

(73) Assignee: Thales, Paris (FR)

( * ) Notice: Subject to any disclaimer, the term of this patent is extended or adjusted under 35 U.S.C. 154(b) by 15 days.

(21) Appl. No.: 10/450,045

(22) PCT Filed: Dec. 11, 2001

(86) PCT No.: PCT/FR01/03927

§ 371 (c)(1),
(2), (4) Date: Jun. 10, 2003

(87) PCT Pub. No.: WO02/48735

PCT Pub. Date: Jun. 20, 2002

(65) Prior Publication Data

US 2004/0061640 A1 Apr. 1, 2004

(30) Foreign Application Priority Data

Dec. 15, 2000 (FR) .................................. 00 16414

(51) Int. Cl.
*G01S 7/282* (2006.01)
*G01S 13/02* (2006.01)
*G01S 13/04* (2006.01)
*G01S 13/93* (2006.01)

(52) U.S. Cl. ............................ 342/27; 342/21; 342/70; 342/118; 342/134; 701/300; 701/301

(58) Field of Classification Search ........ 375/130–153; 342/21, 22, 27, 28, 70, 71, 72, 118, 120, 82, 342/175, 195, 134–144, 200–205; 332/103–116, 332/163; 701/300, 301

See application file for complete search history.

(56) References Cited

U.S. PATENT DOCUMENTS

| | | | | |
|---|---|---|---|---|
| 2,666,134 A | * | 1/1954 | Dicke .......................... | 332/163 |
| 4,325,138 A | * | 4/1982 | Zscheile, Jr. ................ | 375/130 |
| 4,357,610 A | * | 11/1982 | Kingston et al. ............. | 342/21 |
| 4,937,580 A | * | 6/1990 | Wills ........................... | 342/22 |
| 5,049,839 A | * | 9/1991 | Jun ............................. | 332/103 |

FOREIGN PATENT DOCUMENTS

EP 0998064 A1 * 5/2000

* cited by examiner

*Primary Examiner*—Bernarr E. Gregory
(74) *Attorney, Agent, or Firm*—Lowe Hauptman & Berner, LLP

(57) ABSTRACT

The present invention relates to an ultrawideband radar. It also relates to a modulator, in particular for switching microwaves over a very short duration. The radar includes a modulator modulating a carrier microwave, this modulator including a microwave mixer means for generating a modulation signal. The microwave enters on one input of the mixer and the modulation signal on the other input of the mixer, the output signal from the mixer being provided to the transmission means of the radar. Advantageously, the modulation signal may be pulsed and of very short duration. A local oscillator, operating as a free oscillator, provides the microwave to be modulated. The invention applies in particular in respect of aiding the parking of motor vehicles. More generally, it applies in respect of all applications which require low-cost high distance resolution radar detection.

13 Claims, 4 Drawing Sheets

BROADBAND RADAR AND MODULATOR, IN PARTICULAR FOR MICROWAVE SWITCHING OVER A VERY SHORT PERIOD

CROSS-REFERENCE TO RELATED APPLICATIONS

The present Application is based on International Application No. PCT/FR01/03927, filed on Dec. 11, 2001, which in turn corresponds to FR00/16414 filed on Dec. 15, 2000, and priority is hereby claimed under 35 USC §119 based on these applications. Each of these applications are hereby incorporated by reference in their entirety into the present application.

BACKGROUND OF THE INVENTION

The present invention relates to an ultrawideband radar. It also relates to a modulator, in particular for switching microwaves over a very short duration. It applies in particular in respect of aiding the parking of motor vehicles. More generally, it applies in respect of all applications which require low-cost high distance resolution radar detection.

SUMMARY OF THE INVENTION

The growing safety and comfort requirements expressed by motorists are leading to an increase in automotive equipment, in particular in sensors of all kinds. A particular requirement is aid with parking. It is known that the parking of a vehicle is not without risks to hardware and to persons. A poor assessment of the distances to a rear obstacle, a wall or another vehicle, may cause a prang and hence damage to hardware such as for example a broken rear light or a damaged fender. The cost of the repairs, not inconsiderable even when the damage to hardware is minor, may render an aid to the detection of obstacles profitable. Aside from these risks to hardware, there are definite risks to persons, in particular in respect of pedestrians walking near a vehicle being parked. One thinks in particular of a child who would thus be outside the driver's field of view.

Aid with parking typically requires detection ranges of the order of a few meters, two meters for example, and a resolution of a few centimeters, five to ten centimeters for example. A known solution consists in using acoustic sensors. Several acoustic sensors are thus disposed at the rear of a vehicle, four for example, and the distance with respect to an obstacle is then determined conventionally by a method of triangularization from the measurements produced by each of the sensors.

However, acoustic sensors have several drawbacks. A first drawback is that an acoustic sensor does not operate, or operates very poorly, if the movements of the carrier are abrupt or fast, on account of the turbulence produced. Another drawback stems from the limited range, and this may prevent multifunction use in particular. Moreover, to correctly detect, acoustic sensors must always be mounted conspicuously so as to be directly facing the obstacle to be detected. This has the consequence of modifying the exterior appearance of the vehicles, often deemed undesirable by motor vehicle manufacturers. Furthermore, these sensors are subjected to exterior degradations engendered by the meteorological conditions, rain for example, and also by acts of vandalism. Additionally, they do not operate in all weathers and are in particular disturbed by the impact of water droplets on the sensor in the presence of rain.

Radar sensors make it possible to circumvent all these drawbacks. Nevertheless, a problem of cost, compatible with large-consumption use as in the automotive field for example, still needs to be surmounted. Cheap carrier-free radars are known. However, these radars pose problems of interference with other microwave systems in service, such as GPS for example. To avoid this interference, the radar must transmit by means of a carrier wave of sufficiently high frequency. This carrier may for example have a frequency of the order of 24 GHz or else lie in the millimeter region. In particular, the sensor must exhibit a wide operating frequency band on account in particular of the small distance from the radar to the target which is typically from one to two meters only, and of the discriminating capability required for the application envisaged. A frequency or phase modulation can then be carried out over a very wide frequency band. This solution is nevertheless expensive to implement on account in particular of the problems of stabilization and of linearity of the local oscillator. Specifically, at very high frequencies, the stability of the oscillator can only be maintained through a stabilization loop which is complex to implement. Another solution then consists in transmitting pulses of very small width so that they exhibit a smaller duration than the run of the outward/return journey to the closest target and that two very close targets are separated. For this purpose, these pulses must exhibit a width of less than a nanosecond, of the order of 500 picoseconds for example. Such pulses are very difficult to produce, at least cheaply.

An aim of the invention is to allow the production of a very low cost wideband radar. For this purpose, the subject of the invention is a radar comprising a modulator modulating a carrier microwave, this modulator including:

a microwave mixer;

means for generating a modulation signal.

The microwave enters on one input of the mixer and the modulation signal enters on the other input of the mixer, the output signal from the mixer being provided to the transmission means of the radar.

Advantageously, the modulation signal may be pulsed and of very short duration. A local oscillator, operating as a free oscillator, provides the microwave to be modulated.

The subject of the invention is also a microwave modulator, capable in particular of providing pulses of very short durations cheaply.

The other main advantages of the invention are in particular that it makes it possible to obtain a radar with a very high level of integration, moreover having the possibility of being multifunctional. Finally, a microwave switch or modulator according to the invention can produce all types of modulation and can in particular modulate optical waves.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

Other characteristics and advantages of the invention will become apparent with the aid of the description which follows in conjunction with the appended drawings which represent.

DETAILED DESCRIPTION OF THE INVENTION

Figure 1:
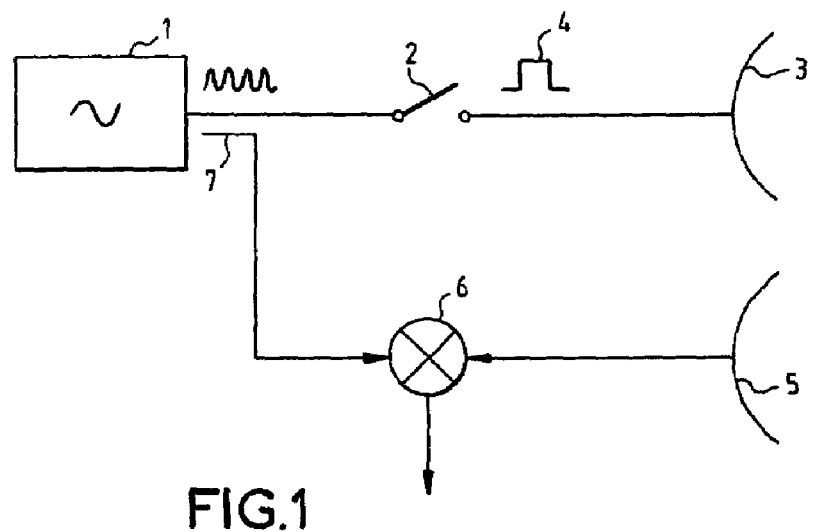
FIG. 1, an illustration of a pulse radar according to the prior art.

FIG. 1 illustrates through a schematic a known embodiment, according to the prior art, of a pulse radar. It comprises a local oscillator 1 providing the carrier wave. This carrier wave passes through a switch 2 before being transmitted by a transmit antenna 3. When the switch 2 is open, no signal is transmitted. The duration of a transmitted pulse 4 is determined by the closure time of the switch. This pulse 4 modulates the carrier wave. Still conventionally, the reception signals are received by a receive antenna 5. The signal received is fed to the input of a microwave mixer 6, the other input of this mixer being fed with a signal emanating from the local oscillator via a coupler 7 so as to obtain at the output of the mixer a demodulated signal, where the carrier is suppressed. One thus obtains an image signal of the pulse transmitted, or of the string of pulses transmitted following its outward/return journey to the target. The switch 2 is for example a PIN diode or an FET transistor. These components do not make it possible to obtain a pulse 4 of smaller width than around 10 nanoseconds, and are therefore far from allowing widths of less than a nanosecond. Moreover, at such pulse durations, the shape of the pulse is of very mediocre quality. It is far from being perfectly square and therefore does not pass the entire frequency band desired. Additionally, the switching edges must necessarily be steep. Now, the local oscillator 1 is disturbed upstream by overly steep edges. A radar such as illustrated by FIG. 1 can therefore only operate with difficulty over a wide frequency band and not cheaply.

Figure 2:
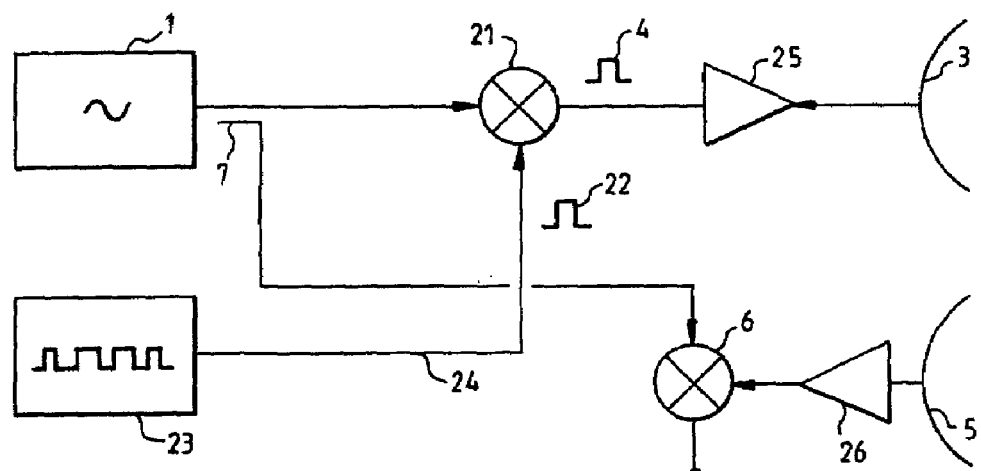
FIG. 2, through a schematic a first exemplary embodiment of a radar according to the invention.

FIG. 2 illustrates through a schematic an exemplary embodiment of a radar according to the invention. This is for example an amplitude modulation or phase modulation radar. The modulation pulse 4 is not produced by a breaker, but by means of a microwave mixer 21 and of a reference pulse 22. The latter is for example provided by a digital circuit 23. The current digital circuits are in fact capable of providing very short pulses, of less than a nanosecond in particular, for example of the order of 500 picoseconds. The shape of the pulses provided is for example square. The radar moreover comprises at least one local oscillator 1, which operates as a free oscillator, that is to say one which is not controlled. It also comprises a transmit antenna 3 and receive circuits 5, 6. A first input of the mixer 21 receives the signal provided by the oscillator 1. The second input of this mixer receives the reference pulse 22. The mixing of the latter with the carrier creates at the output of the mixer a signal modulated by a pulse which is the image of this reference pulse. That is to say the modulation pulse 4 has a pulse width and rising and falling edges which are substantially identical to the width and to the edges of the reference pulse. The mixer 21 can have a conventional structure. It may in particular be produced on the basis of diodes or of microwave transistors. Given the frequencies involved, it may be necessary to provide matching of the line 24 between the circuit 23 for generating the reference pulse 22 and the mixer 21 so as to allow in particular the passage of the entire frequency band. In particular, it is preferable for this line 24 to be as short as possible. Ideally, the mixer and the pulse generation circuit 23 are produced on one and the same chip, one and the same integrated circuit, for example of the MMIC type. If necessary, the signal at the output of the mixer 21 is amplified on transmission by amplifying means 25 before being fed to the transmit antenna 3. The power transmitted is for example of the order of 10 mW, even less. Reception may for example be carried out as in the case of the radar of FIG. 1, that is to say with a receive antenna 5 linked to an input of the mixer 6 whose other input receives the carrier wave provided by the local oscillator 1 via a coupler 7. This mixer 6 then outputs a demodulated signal, the image of the pulse transmitted and intended for the processing circuits. An amplifier 26 is for example placed between the receive antenna 5 and the mixer 6 so as to amplify the signal received.

Figure 3A:
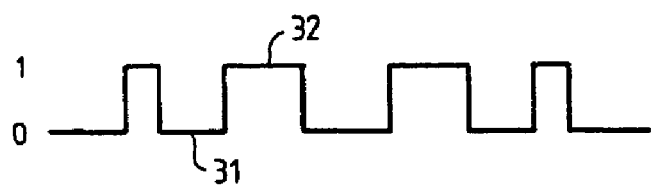
FIGS. 3a and 3b, two exemplary modulation codes used by a radar according to the invention.
Figure 3B:
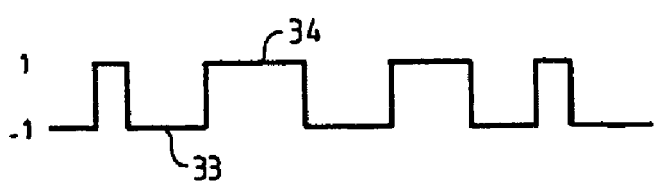

FIGS. 3a and 3b illustrate exemplary modulation codes used by a radar according to the invention. It is possible to envisage transmission with a single pulse, transmitted periodically. However, there may be problems of interference or of compatibility with other microwave systems present in the environment of the radar. To alleviate these problems, the radar according to the invention works for example on several pulses at each recurrence period, and in particular on a large number of pulses. FIGS. 3a and 3b illustrate two exemplary strings of pulses used. These strings are for example pseudo-random, according for example to a Barker code. FIG. 3a presents a code varying between 0 and 1. More particularly, this code comprises a string of elementary moments taking the value 0 or 1, the duration of an elementary moment being for example equal to 1 ns, or less, for example 500 ps. This amounts to multiplying the carrier, provided by the local oscillator, successively by 0 and by 1 according to the code. When the voltage of the reference pulse 22 is zero at the input of the mixer 21, corresponding to the low 31 of the pulse string, the output of this mixer does not provide any signal. When the voltage is non zero, corresponding to a high 32 of the pulse string, the output of the mixer provides the product of the carrier times a constant signal, of infinite bandwidth, hence equal to the carrier. Thus, when a pulse of the string is at 0 the radar does not transmit, the signal being zero at the output of the mixer 21. When the signal is at 1, the radar transmits the signal provided by the local oscillator, possibly amplified. FIG. 3b presents a code varying between −1 and +1, more precisely taking the values −1 or +1. For this purpose, the control of the mixer 21 is off-centered with respect to the 0 level of the 0–1 code of FIG. 3a. In this way, when the voltage of the pulse string, at the input of the mixer 21, is at the low level 33, the carrier is multiplied by −1, this corresponding to undergoing a shift of π. When the voltage is at the high level 34, the carrier is multiplied by 1. In these cases, there is continuous transmission and the average value of the signal transmitted is zero. This may afford an advantage. Specifically, in the event of overlapping of the pulse strings transmitted, typically a second pseudo-random string is transmitted before the end of the transmission of the previous string. On reception, this overlapping gives a non zero correlation result, and consequently considerable sidelobe levels straddling the correlation peak. With a zero average value of transmitted signal, it is then always possible to define a code such that whatever the position of a pulse string with respect to the previous one, the correlation result related to the overlap is close to zero, and consequently the sidelobes very small with respect to the correlation peak, as illustrated for example in FIG. 4.

Figure 4:
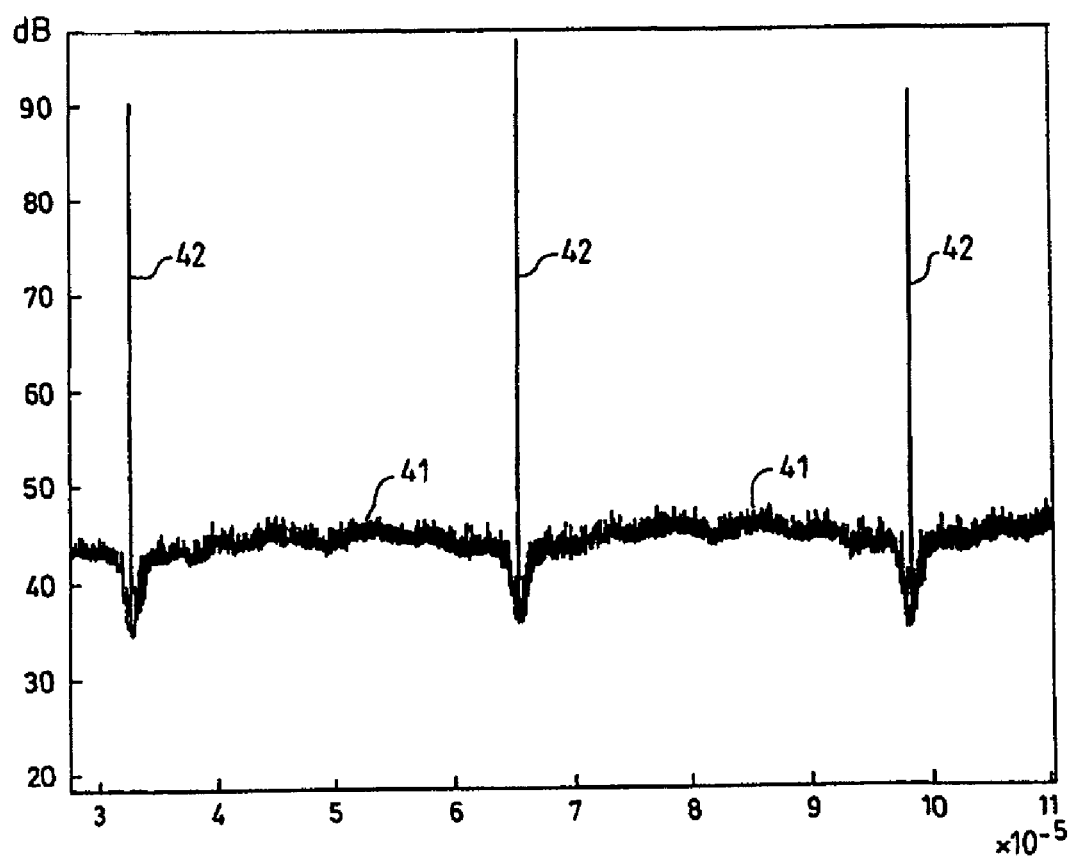
FIG. 4, an exemplary correlation result obtained with a modulation code varying between −1 and +1.

FIG. 4 shows in fact a correlation result with sidelobes 41 of less than around 50 dB with respect to the correlation peaks 42, this being so whatever the relative position of the pulse strings, whether or not there is any overlap. Moreover, the code may be a feedback polynomial whose periodicity is greater than the outward/return propagation time for a target of maximum range, thereby avoiding ambiguity problems in particular. Thus, the code used comprises for example 32768 moments. If one assumes continuous transmission where each moment lasts a nanosecond, 1 ns, taking the value −1 or 1 in a pseudo-random manner, the total duration of the complete transmission of the code is 32768 times 1 ns, i.e. around 32 μs, this corresponding to the repetition frequency. Given that a microsecond corresponds to around 150 meters distance-wise, it follows that the ambiguity distance is here of the order of 4.9 km, very amply sufficient for the applications in question, which have a maximum range of a few meters to a few tens of meters. Apart from the benefit inherent in ambiguity, a long code makes it possible to work at lower peak power, which affords better efficiency and may also allow a saving in the amplification of the power transmitted. This makes it possible for example to make a saving in the amplifier 25 at the output of the mixer 21.

Figure 5:
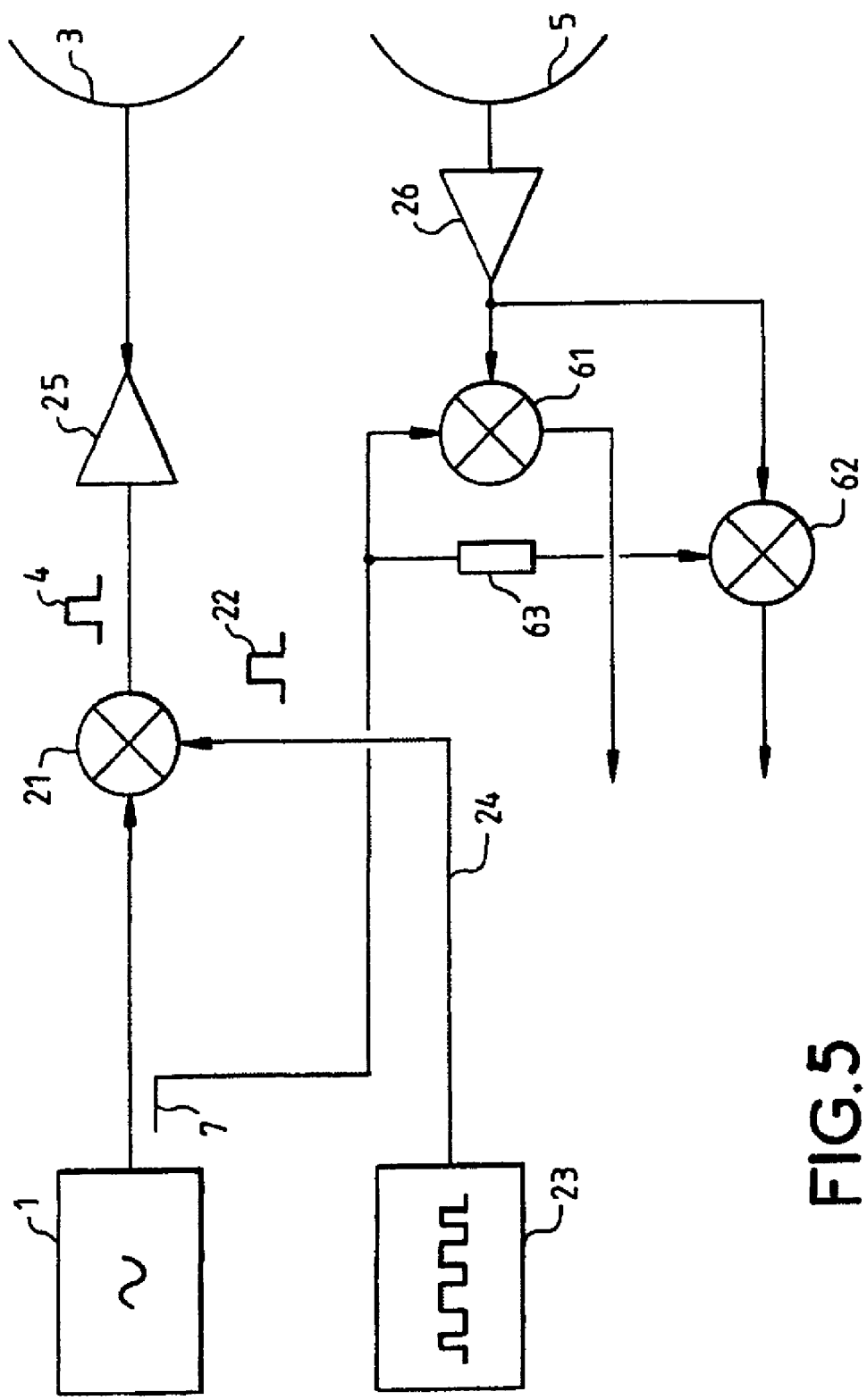
FIG. 5, an exemplary embodiment of a radar according to the invention comprising a dual microwave mixer in reception.

FIG. 5 presents an embodiment comprising two receive mixers 61, 62. A circuit 63 placed on the input path of one of the two mixers 61 phase shifts the signal from the oscillator 1 by π/2. The reception signal feeds each of these two mixers, their outputs are linked to the processing circuits. An I, Q mixer is thus obtained. This embodiment is especially adapted for a coding of the pulses transmitted according to FIG. 3b, that is to say varying between −1 and +1. Specifically, in this case the modulation mixer 21 is offcentered with respect to the 0 level as indicated previously. In particular, the control of the reception mixer 6 must also be offcentered. There is then the risk of the presence of uncontrolled microwave leakages. The use of two mixers may enable these leakages to be avoided.

Figure 6:
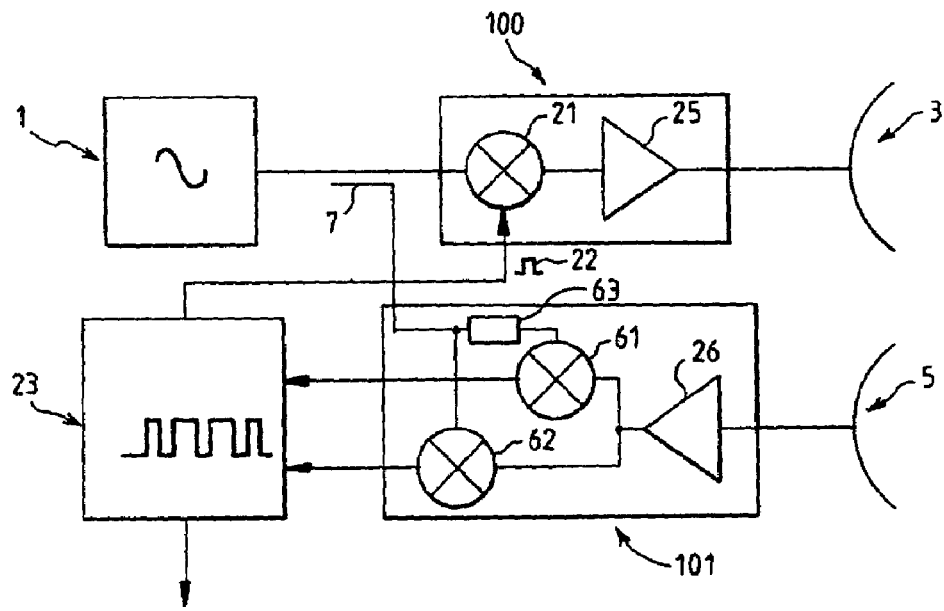
FIG. 6, an exemplary embodiment of a radar according to the invention where one and the same digital circuit provides the modulation codes and processes the reception signals.

FIG. 6 presents an embodiment of a radar according to the invention where the circuit 23 which generates the modulation pulses additionally comprises the circuits for processing the reception signals after demodulation, that is to say the code received. In this case, the output of the mixer 6, or the outputs of the mixers 61, 62 are connected at the input of this circuit 23. The circuit 23 is therefore a digital modulation and correlation circuit which generates coded pulses 22 intended for the modulation mixer 21 on transmission and which comprises the processing circuits, in particular for the detection of a target.

Figure 7:
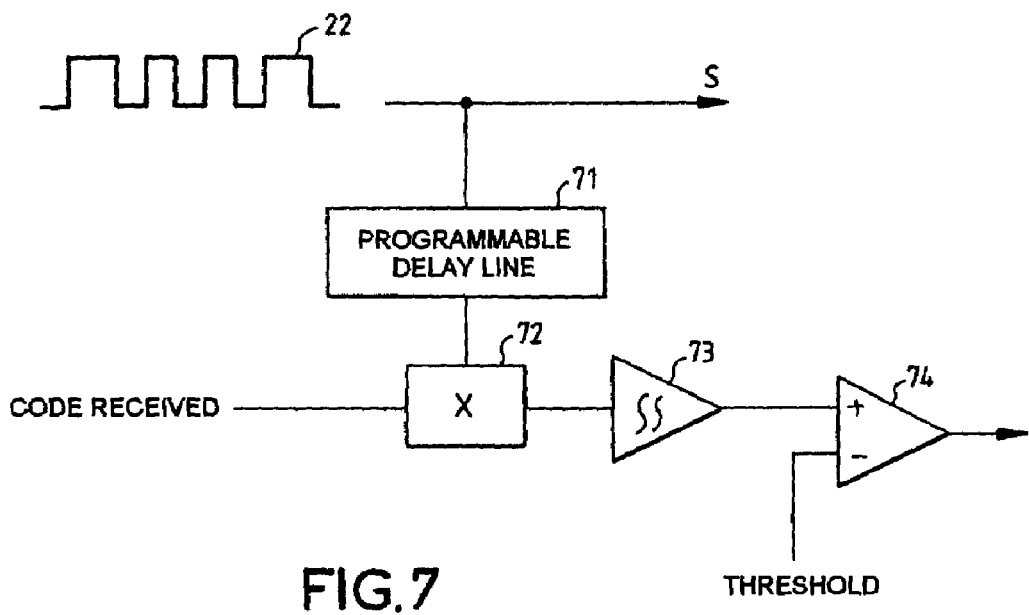
FIG. 7, a schematic illustration of the aforesaid digital circuit.

FIG. 7 presents through a schematic the functions of the modulation and correlation circuit 23. This circuit therefore generates the code pulses 22 in a conventional manner, for example by means of a shift register. These pulses are directed at the output S so as to energize the mixer 21 on transmission and to energize an internal circuit 71 which is for example a programmable delay line. The output of this delay line is connected to the input of a multiplier 72 which multiplies the shifted code by the code received, provided by the mixers 61, 62. The multiplier 72 multiplies these binary values together. The result of the multiplication is integrated by integration means 73. The latter sum the bits of the multiplication result. Stated otherwise, if a 1 or a −1 of the code received coincides respectively with a 1 or a −1 of the shifted code, provided by the delay line, the integration means sum this bit with the previous ones. The output of the integration means is linked to the input of a comparator 74 so as to be compared with a threshold. The result of the comparison defines the correlation between the received code and the shifted code, that is to say determines the presence or otherwise of the target in the distance bin monitored. The delay effected by the delay line 71 on the code transmitted corresponds to this given distance bin. If the result of the integration is greater than the threshold, the circuit 23 deduces therefrom the presence of the target in the distance bin.

Advantageously, the radar according to the invention does not examine all the distance bins simultaneously. By way of example, if one considers a maximum range of two meters for a distance resolution of 10 cm, i.e. 20 distance bins, the examination of the 20 distance bins necessitates the performing of 20 correlations, as described previously. By reason of the short range, all the distance bins are not monitored simultaneously but periodically. The radar commences for example by processing the $20^{th}$ distance bin, then the $19^{th}$ and so on and so forth. When a target is detected in a distance bin, the radar tracks this target. A processor (not represented), integrated into the modulation and correlation circuit 23, processes the results of the comparison, and additionally manages the order of processing of the distance bins, in particular through the programming of the delays performed by the delay line.

FIG. 6 shows a radar comprising, in addition to the antennas 3, 5, four integrated-circuit components. A first component is the local oscillator 1. A second component 100 contains the modulation mixer 21 and for example the transmission amplifier 25. A third component 101 comprises the reception mixer or mixers 61, 62 as well as for example the amplifier 26. A fourth component is the modulation and correlation circuit 23. The technology of the latter is for example known by the name ECL Fast or else by the name BICMOS. The other components are for example of GaAs (gallium arsenide) technology. The example of FIG. 6 presents an embodiment where the essential functions of the radar are dispersed over four components, outside the antennas. It is possible to envisage disposing all these functions in two components, in particular with a component comprising the oscillator 1, the mixers 21, 61, 62 and the amplifiers, the coupler 7 in fact being produced conventionally by the coupling of two microwave lines. If the technologies are compatible, it is then possible to integrate all the functions, including the modulation and correlation circuit 23 onto one and the same component. The antennas 3, 5 consist for example of printed arrays of the patch type. Advantageously, these antennas are almost nondirectional and can therefore radiate over a wide space. The antennas can also for example be of the resonant type with dipoles.

A radar according to FIG. 6 is very compact and trim. Moreover, it may be produced at very low cost and in particular for the mass market. Specifically, the components used are cheap. In particular, they can be produced at very low cost in the form of ASIC type application specific integrated circuits. The modulation pulses 4 may be of very small width, less than 1 ns, or even reach 500 ps or lower. Thus a pulse radar according to the invention can work up to frequency bands reaching 2 GHz.

Other functions may also be performed by these same circuits. In particular, a radar according to the invention can also undertake Doppler detection. Types of modulation other than pulses may moreover be produced, by virtue of the mixer 21 disposed in the transmit circuit, coupled to the circuit 23 generating modulation signals.

A microwave switch as produced by the association of the mixer 21 and the circuit 23, in the guise of pulse generator 22, may of course be used for radar applications, and also for applications involving optical waves. In particular this switch, associated with means of opto-electronic coupling, can modulate optical waves. In this case, it is sufficient to place an opto-electronic component at the input and at the output of the mixer 21. At the input, the component ensures a transition from optical to microwave, and the output component does the reverse. The other input of the mixer is of course still coupled to the output of the means 23 for generating pulses 22. These same means may provide modulation signals other than pulsed signals. In this way, the switch then operates as a modulator which can produce all types of modulations. Advantageously, the means 23 for generating pulses or modulation signals may be integrated into one and the same circuit, for example of the MMIC type.

A radar according to the invention can be applied in respect of all fields requiring a very large operating frequency band. It is very cheap and exhibits a very high level of integration. Moreover, it has the possibility of being multifunctional. Finally, the microwave switch or modulator that it uses can produce all types of modulations and can in particular modulate optical waves.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A radar comprising:
a local oscillator providing a microwave signal;
a receive antenna linked to reception means, the signal at the output of reception means being intended for processing circuits;
a modulator modulating the microwave signal provided by the local oscillator, the modulator comprising means for generating a modulation signal, wherein, the modulator has a microwave mixer, the microwave signal entering on one input of the microwave mixer and the modulation signal entering on another input of the microwave mixer, the output signal from the microwave mixer being provided to transmission means of the radar, wherein the modulation signal is pulsed,
wherein the local oscillator operates as a free oscillator.

2. The radar as claimed in claim 1, wherein the local oscillator operates as a free oscillator.

3. The radar as claimed in claim 1, wherein a transmit antenna is linked to the output of the mixer.

4. The radar as claimed in claim 3, wherein the antenna is linked to the mixer via amplifying means.

5. The radar as claimed in claim 1, wherein the reception means comprise at least one microwave mixer, the receive antenna being linked to the input of at least one microwave mixer whose other input receives the microwave, the demodulated signal obtained at the output of the mixer being intended for the processing circuits.

6. The radar as claimed in claim 5, wherein the reception means comprise a dual mixer, a circuit placed on the input path of one of the two mixers phase shifting the carrier wave by π/2.

7. The radar as claimed in claim 1, wherein the modulator provides several pulses per recurrence period.

8. The radar as claimed in claim 7, wherein the modulator provide a pseudo-random code.

9. The radar as claimed in claim 7, wherein the means provide a code taking the values −1 or 1.

10. The radar as claimed in claim 7, wherein the code is a polynomial whose periodicity is greater than the outward-lretum propagation time to a target of maximum range.

11. The radar as claimed in claim 1, wherein the means for generating the pulses are a digital circuit moreover comprising the reception signals processing circuits.

12. The radar as claimed in claim 1, wherein it processes the distance bins in a periodic manner.

13. The radar as claimed in claim 1, wherein the antennas each consist of an array of patches.

* * * * *